United States Patent
Cui et al.

(10) Patent No.: US 10,996,094 B2
(45) Date of Patent: May 4, 2021

(54) MICA WATER LEVEL GAUGE GLASS

(71) Applicant: Qinhuangdao Huadian Measurement & Control Equipment Co., LTD, Hebei (CN)

(72) Inventors: Mingsi Cui, Qinhuangdao (CN); Shaobin Dong, Qinhuangdao (CN); Jichuan Liu, Qinhuangdao (CN); Hai Qu, Qinhuangdao (CN); Xueying Qu, Qinhuangdao (CN)

(73) Assignee: QINHUANGDAO HUADIAN MEASUREMENT & CONTROL EQUIPMENT CO., LTD, Qinhuangdao (CN)

( * ) Notice: Subject to any disclaimer, the term of this patent is extended or adjusted under 35 U.S.C. 154(b) by 193 days.

(21) Appl. No.: 16/196,667

(22) Filed: Nov. 20, 2018

(65) Prior Publication Data

US 2019/0170557 A1    Jun. 6, 2019

(30) Foreign Application Priority Data

Dec. 6, 2017    (CN) .......................... 201711275174.9

(51) Int. Cl.
| | |
|---|---|
| G01F 23/02 | (2006.01) |
| G01F 23/16 | (2006.01) |
| G01F 23/00 | (2006.01) |
| F22B 37/78 | (2006.01) |

(52) U.S. Cl.
CPC .............. *G01F 23/02* (2013.01); *F22B 37/78* (2013.01); *G01F 23/0046* (2013.01); *G01F 23/162* (2013.01)

(58) Field of Classification Search
CPC ............................... G01F 23/02; G01F 23/162
See application file for complete search history.

(56) References Cited

U.S. PATENT DOCUMENTS

2014/0318480 A1* 10/2014 Liu ....................... F22B 37/428
122/504.2

FOREIGN PATENT DOCUMENTS

| CN | 2676034 Y | * | 2/2005 |
| CN | 206161094 U | * | 5/2017 |

* cited by examiner

*Primary Examiner* — Walter L Lindsay, Jr.
*Assistant Examiner* — Andrew V Do
(74) *Attorney, Agent, or Firm* — Emerson, Thomson & Bennett, LLC; Roger D. Emerson

(57) ABSTRACT

A mica water level gauge glass includes a steam tee fitting, a balance pipe, a water tee fitting, a steam connecting pipe, a water connecting pipe, a condensation tank, a longitudinal vertical gauge body, and a mica assembly. The gauge body includes a thermal compensation cavity, a steam-water cavity, an auxiliary heat confluence device, and a horizontal steam cavity. The exit points of the thermal compensation cavity arranged in the gauge body is lower than the point of the steam-water cavity exiting from the gauge body.

7 Claims, 5 Drawing Sheets

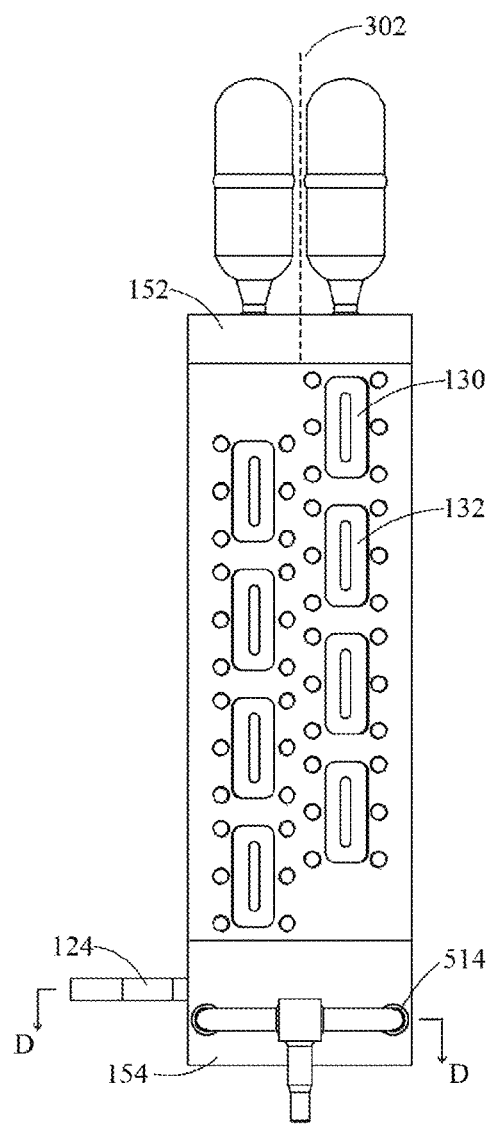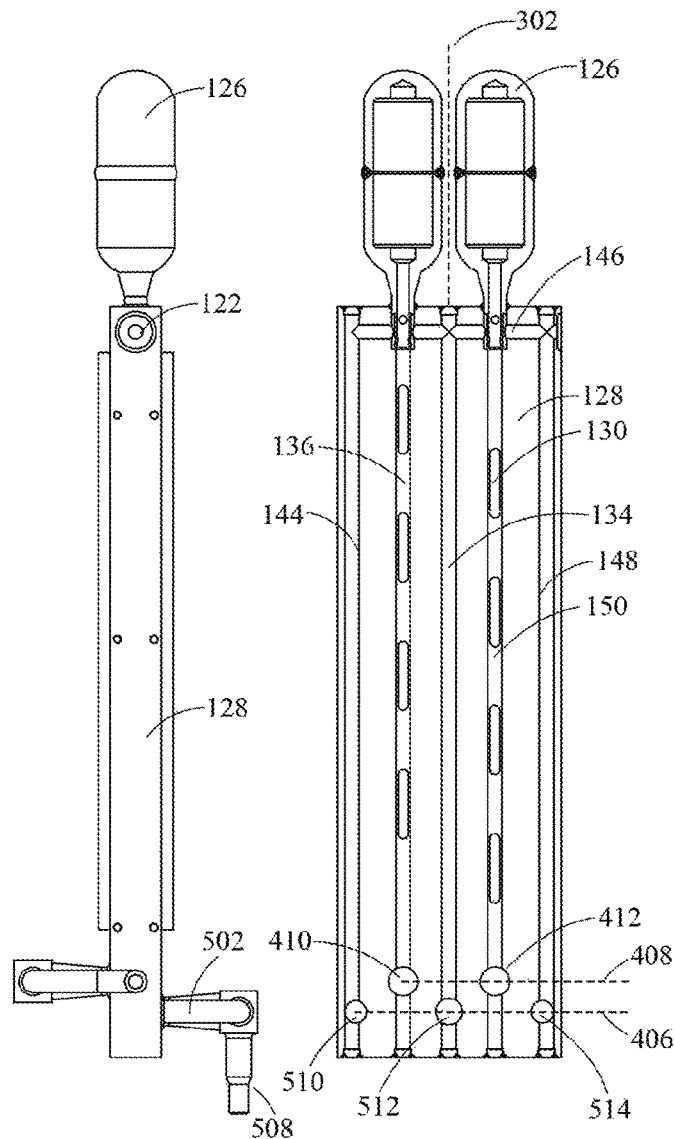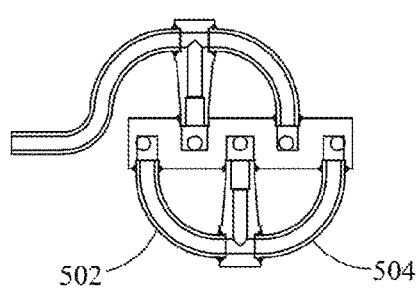
Fig. 5A  Fig. 5B  Fig. 5C
Fig. 5D

MICA WATER LEVEL GAUGE GLASS

CROSS-REFERENCE TO RELATED APPLICATIONS

This application is related to and claims the priority from Chinese Application No. 201711275174.9, filed on Dec. 6, 2017 and entitled "Mica Water Level Gauge Glass", the entire disclosure of which is hereby incorporated by reference.

TECHNICAL FIELD

The present disclosure relates to boiler accessory products, specifically, the present disclosure relates to a mica water level gauge glass.

BACKGROUND

The water level in a boiler drum of a power plant is of vital importance to ensure the safe and economic operation of a steam turbine generator. If the water level in a drum is too low, it may lead to safety problems such as pipe explosion or even a dried boiler, causing serious consequences such as downtime of the generator. On the other hand, if the water level in the drum is too high, it may result in serious problems such as water being carried with the steam into the steam turbine, causing steam corrosion or shaft fracture. Therefore, an accurate, real-time and automatic monitoring of the water level in the drum to safeguard a stable operation of the drum is an important precondition and guarantee for the efficient, safe, economical energy-saving, and optimized operation of the power generator.

Mica water level gauge glass is an instrument used to monitor the change of water level and installed on the boiler drum or other pressure vessels. The mica water level gauge glass is manufactured utilizing connected vessels. The gas is shown in red and the liquid is shown in green through light reflection, refraction, and transmission. The operator may directly observe the change of the water level in the water level gauge to determine the water level in the drum.

Existing mica water level gauge glass for drum water level, have been described in the Chinese utility model patents with patent Nos. ZL200320127482.4 and ZL201620918725.3. In existing mica water level gauge glasses, bottom sections of two steam-water cavities are disposed outside the body, resulting in the deficiencies that the sections of the steam-water cavities outside the gauge body cannot be heated by the thermal compensation cavity, causing deviations in the water level measurements. Moreover, there are crossings between the steam-water cavities and the thermal compensation cavities, resulting in a complex and error-prone manufacturing process. When the points at which the thermal compensation cavities exit the gauge body are higher than the points at which the steam-water cavities exit the gauge body, bottom sections of the steam-water cavities can also not be completely heated by the thermal compensation cavities. Furthermore, the exit points of the thermal compensation cavities and the auxiliary heat confluence device may occupy certain space from the mica window to the water exit pipe, so that the mica assembly cannot be mounted in this space, and the water level of this section cannot be observed, that is, the measurement range and the visible range are reduced.

In order to overcome the insufficiencies of the existing mica water level gauge glasses, it is necessary to develop a mica water level gauge glass which has higher precision and a wider measurement range.

SUMMARY

The present disclosure provides a mica water level gauge glass, to overcome the insufficiencies of the existing mica water level gauge glasses for measuring drum water levels, improve the accuracy of the water level measurement, facilitate processing and manufacturing, and increase the measurement range.

To overcome the insufficiencies in the existing technology, one aspect of the present disclosure provides:

A mica water level gauge glass for connecting to a boiler drum through a steam sampling pipe and a water sampling pipe, the mica water level gauge glass comprising: a steam tee fitting having an inlet, an outlet and a branch, the inlet of the steam tee fitting in communication with the steam sampling pipe; a water tee fitting having an inlet, an outlet and a branch, the inlet of the water tee fitting in communication with the water sampling pipe; a balance pipe connecting the branch of the steam tee fitting and the branch of the water tee fitting; a steam connecting pipe having a first end and a second end, the first end of the steam connecting pipe connected to the outlet of the steam tee fitting; a water connecting pipe having a first end and a second end, the first end of the water connecting pipe connected to the outlet of the water tee fitting; a longitudinal vertical gauge body comprising: a top; a bottom; a central vertical axis; a thermal compensation cavity having a first end near the top and a second end exiting the gauge body at a first height near the bottom; a steam-water cavity having a first end near the top and a second end exiting the gauge body at a second height near the bottom and connected to the second end of the water connecting pipe, the second height being higher than the first height; and a horizontal steam side cavity in communication with the second end of the steam connecting pipe, the first end of the thermal compensation cavity and the first end of the steam-water cavity; a mica assembly along the steam-water cavity; an auxiliary heat confluence device having a first end and a second end, the first end connected to the second end of the thermal compensation cavity, the second end for draining condensed water; and a condensation tank at the top of the gauge body and aligned with the steam-water cavity in a vertical direction.

Preferably, the thermal compensation cavity is a first thermal compensation cavity provided along the central vertical axis of the gauge body, the steam-water cavity is a first steam-water cavity on a left side of the first thermal compensation cavity, the water connecting pipe has a third end, the auxiliary heat confluence device has a third end and a forth end, preferably, the mica water level gauge glass further comprises: a second steam-water cavity on a right side of the first thermal compensation cavity, the second steam-water cavity having a first end connected to the horizontal steam side cavity, and a second end exiting the gauge body at the second height and connected to the third end of the water connecting pipe; a second thermal compensation cavity on a left side of the first steam-water cavity, the second thermal compensation cavity having a first end connected to the horizontal steam side cavity, and a second end exiting the gauge body at the first height and connected to the third end of the auxiliary heat confluence device; and a third thermal compensation cavity on a right side of the second steam-water cavity, the third thermal compensation cavity having a first end connected to the horizontal steam side cavity and a second end exiting the gauge body at the first height and connected to the fourth end of the auxiliary heat confluence device.

Preferably, the mica water level gauge glass further comprises: a steam valve connecting the steam sampling pipe and a steam valve connecting pipe, the steam valve connecting pipe connected to the inlet of the steam tee fitting; and a water valve connecting the water sampling pipe and a water valve connecting pipe, the water valve connecting pipe connected to the inlet of the water tee fitting.

Preferably, the mica water level gauge glass further comprises: a compensation connecting pipeconnected to the second end of the auxiliary heat confluence device and a downcomer.

Preferably, the mica assembly is a first assembly, the mica water level gauge further comprises a plurality of mica assemblies.

Preferably, the water connecting pipe comprises three bends and a tee joint.

Preferably, the auxiliary heat confluence device comprises two bends and an L-shaped four-way joint.

Another aspect of the present disclosure provides a method for observing a water level in a boiler drum having a water phase and a steam phase, the method comprising: guiding water from the water phase to a vertical water-steam path, the water-steam path having a lower end and an upper end; guiding steam from the steam phase to the water-steam path to form a water-steam interface; guiding the steam from the steam phase to a vertical thermal compensation path proximate to the water-steam path to provide auxiliary heat to the water-steam path, the thermal compensation path having an upper end at or higher than the upper end of the water-steam path, and a lower end lower than the lower end of the water-steam path; and observing the water-steam interface through light reflection, refraction, and transmission.

BRIEF DESCRIPTION OF THE DRAWINGS

FIG. 4 (B) is a side view of a gauge body according to the first embodiment of the present disclosure;

FIG. 4 (C) is a sectional view of a gauge body according to the first embodiment of the present disclosure;

FIG. 4 (D) is a top sectional view of a water connecting pipe in the gauge body at line D-D in FIG. 4(C) according to the first embodiment of the present disclosure;

FIG. 5 (A) is a front view of a gauge body according to a second embodiment of the present disclosure;

FIG. 5 (B) is a side view of a gauge body according to the second embodiment of the present disclosure;

FIG. 5 (C) is a sectional view of a gauge body according to the second embodiment of the present disclosure; and FIG. 5 (D) is a top sectional view of a water connecting pipe in the gauge body at line D-D in FIG. 5(C) according to the second embodiment of the present disclosure.

DETAILED DESCRIPTION OF EMBODIMENTS

Reference will now be made in detail to some specific embodiments of the disclosure. Examples of these specific embodiments are illustrated in the accompanying drawings. While the disclosure is described in conjunction with these specific embodiments, it will be understood that it is not intended to limit the invention to the described embodiments. On the contrary, it is intended to cover alternatives, modifications, and equivalents as may be included within the spirit and scope of the disclosure as defined by the appended claims. In the following description, numerous specific details are set forth in order to provide a thorough understanding of the present disclosure. The present disclosure may be practiced without some or all of these specific details. In other instances, well-known process operations have not been described in detail in order not to unnecessarily obscure the present disclosure.

In this specification and the appended claims, the singular forms "a," "an," and "the" include plural references unless the context clearly dictates otherwise. Unless defined otherwise, all technical and scientific terms used herein have the same meaning as commonly understood to one of ordinary skill in the art to which this invention belongs.

Figure 1:
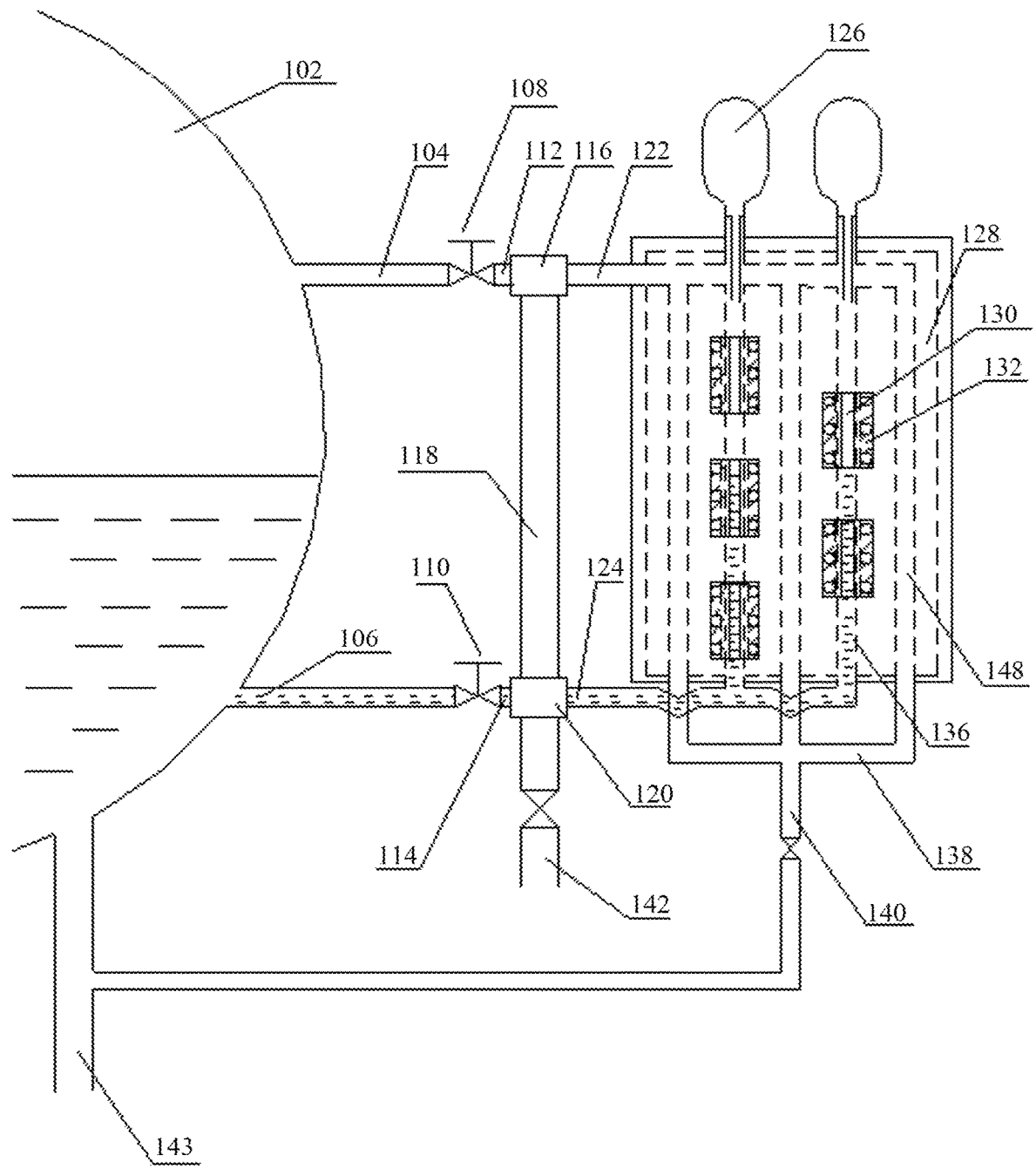
FIG. 1 is a first schematic structural diagram of a mica water level gauge glass for drum water level.
Figure 2:
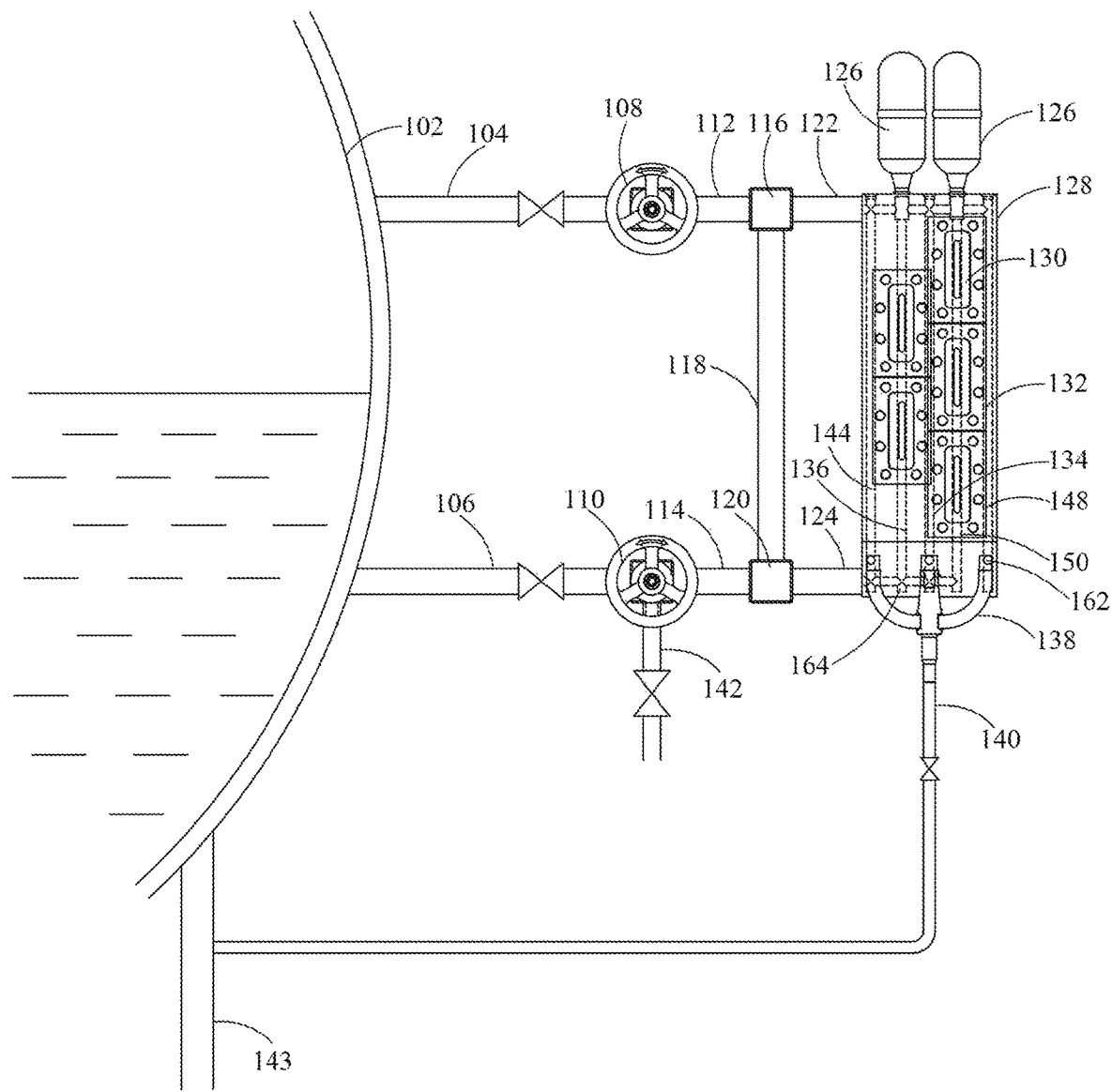
FIG. 2 is a second schematic structural diagram of a mica water level gauge glass for drum water level.

As shown in FIGS. 1 and 2, the mica water level gauge glass is connected to a drum (102), a steam sampling pipe (104), a water sampling pipe (106), a steam valve (108), a water valve (110), a steam valve connecting pipe (112), a water valve connecting pipe (114), a steam tee fitting (116), a balance pipe (118), a water tee fitting (120), a steam connecting pipe (122), a water connecting pipe (124), a condensing tank (126), a gauge body (128), a mica assembly (130), a capping (132), one or more thermal compensation cavities (134, 144, 148), one or more steam-water cavities (136, 150), an auxiliary heat confluence device (138), a compensation connecting pipe (140), a drain pipe (142) and a downcomer (143).

In operation, saturated water in the drum (102) passes through the water sampling pipe (106), the water valve (110), the water valve connecting pipe (114), the water tee fitting (120), and the water connecting pipe (124) into the steam-water cavity (136) in the gauge body (128). The saturated steam in the drum (102) passes through the steam sampling pipe (104), the steam valve (108), the steam valve connecting pipe (112), the steam tee fitting (116) and the steam connecting pipe (122) into the steam-water cavity (136) in the gauge body (128). The saturated water and the saturated steam in the steam-water cavity (136) in the gauge body (128) are mixed. On the basis of the connected vessels, for example but not limited to, in the topology of a U-shaped tube, the dividing line of the saturated water and the saturated steam is the measured water level in the drum (102).

Because the density of water increases as the decrease of temperature under the same pressure, and the ambient temperature of the mica water level gauge glass is much lower than the temperature in the drum (102), the water level in the steam-water cavity (136) in the water level gauge glass is lower than the water level in the drum (102). In order to ensure that the temperature in the mica water level gauge glass is closer to the temperature in the drum (102), and the water level in the steam-water cavity (136) in the water level gauge is closer to the water level in the drum (102), three thermal compensation cavities (134) are provided in the gauge body (128). After the saturated steam enters the three thermal compensation cavities (134), the temperature of the gauge body (128) is increased to be closer to the temperature in the drum (102). The condensed water flows into the downcomer (143) through the auxiliary heat confluence device (138) and the compensation connecting pipe (140).

Part of the saturated steam entering the gauge body (128) enters the condensation tank (126), and becomes water after condensation and flows into the gauge body (128) to wash and clean the mica assembly (130) and replace the water in the steam-water cavity (136) to further increase the water temperature and the water quality and further improve the measurement accuracy of the water level gauge. The mica assembly (130) is mounted between the gauge body (128) and a cap (132), reflects, refracts, and transmits light, and shows the steam in red and water in green for indicating the water level.

The balance pipe (118) connects the steam tee fitting (116) and the water tee fitting (120) to balance the pressure in the steam connecting pipe (122) and the water connecting pipe (124), so that the water column in the steam-water cavity (136) does not fluctuate significantly.

Because the drum (102), the thermal compensation cavity (134) and the compensation connecting pipe (140) are in fluid communication, and because the heat in the compensation connecting pipe (140) is not preserved, but dissipated, the water in the compensation connecting pipe (140) has a lower temperature and a higher density. The compensation connecting pipe (140) is therefore extended downwards by, for example, about 15 meters in height, and then connected with the downcomer (143) to ensure that the thermal compensation cavity (134) is always filled with saturated steam, and that the gauge body (128) and the steam-water cavity (136) in the gauge body have auxiliary heat. The saturated steam from the drum (102) heats the gauge body (128) and water in the steam-water cavity (136), and reduces the outward heat transfer of the liquid in the steam-water cavity (136). The saturated water condensed by the condensation tank (126) is used to replace the water in the steam-water cavity (136) to accelerate the water circulation so that the temperature of the water in the steam-water cavity (136) is closer to the temperature of the saturated water, thereby minimizing the difference between the density of the water in the steam-water cavity (136) and the the water in the drum 102. Therefore, the water level in the water level measurement cavity is close to the actual water level in the drum (102) under any working condition, thereby achieving the goal of accurately monitoring the water level in the drum and with low deviation.

According to the spatial relationship between the steam-water cavity (136), the thermal compensation cavity (134) and the auxiliary heat confluence device (138), the existing mica water level gauge glass for drum water level may be divided into two types. One is shown in FIG. 1, bottom sections of two steam-water cavities (136) are disposed outside the gauge body (128), so that the sections of the steam-water cavities (136) outside the gauge body (128) cannot be heated by the thermal compensation cavity (134). The second type is shown in FIG. 2, two steam-water cavities (136) are integrally disposed inside the gauge body (128), and points (162) at which the thermal compensation cavities (134) exit the gauge body (128) are higher than points (164) at which the steam-water cavities (136) exit the gauge body (128). Similarly, lower sections of the steam-water cavities (136) cannot be completely heated by the thermal compensation cavities (134). The above two conditions may cause additional deviations in the water level measurements. Moreover, there are crossings between the steam-water cavities and the thermal compensation cavities, resulting in a complex and error-prone manufacturing process. When the points at which the thermal compensation cavities exit the gauge body are higher than the points at which the steam-water cavities exit the gauge body, the exit points of the thermal compensation cavities and the auxiliary heat confluence device may occupy certain space from the mica window to the water exit pipe, so that the mica assembly cannot be mounted in this space, and the water level of this section cannot be observed, that is, the measurement range and the visible range are reduced.

FIRST EMBODIMENT

Figure 3:
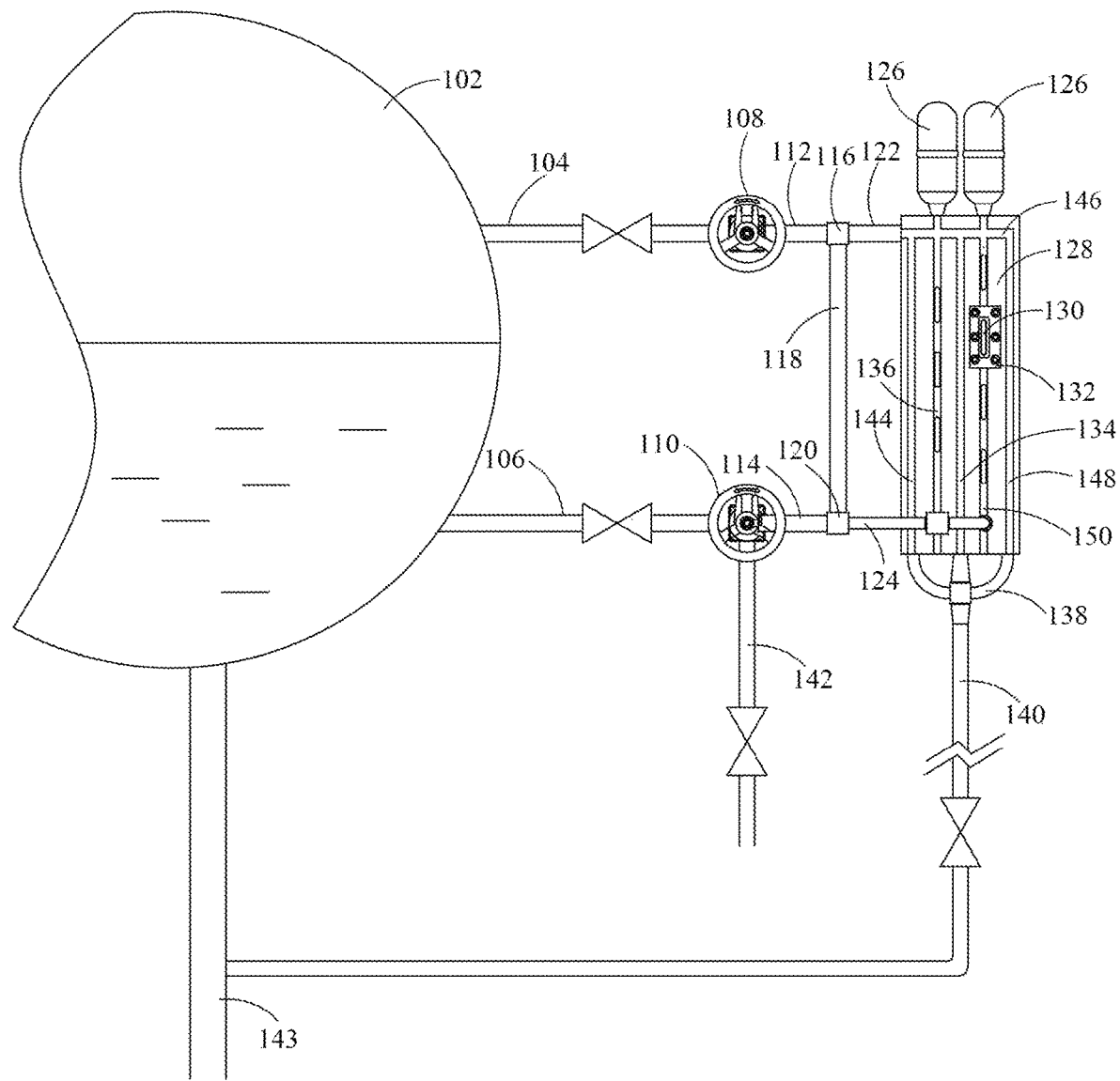
FIG. 3 is a schematic structural diagram of the present disclosure.
Figure 4A:
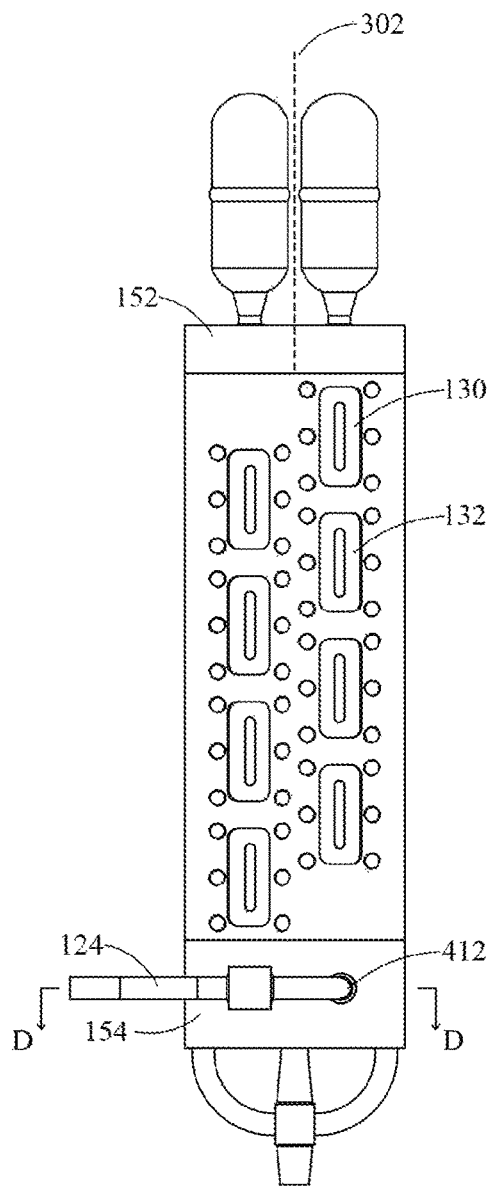
FIG. 4 (A) is a front view of a gauge body according to a first embodiment of the present disclosure.
Figure 4B:
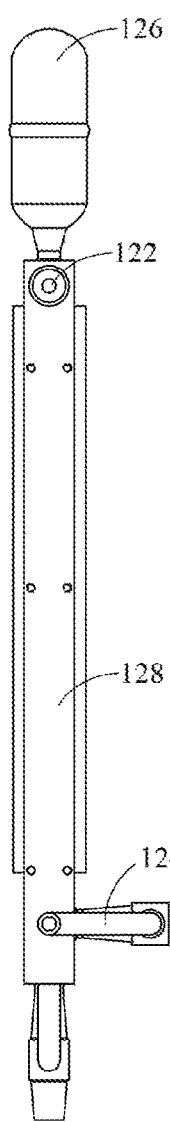
Figure 4C:
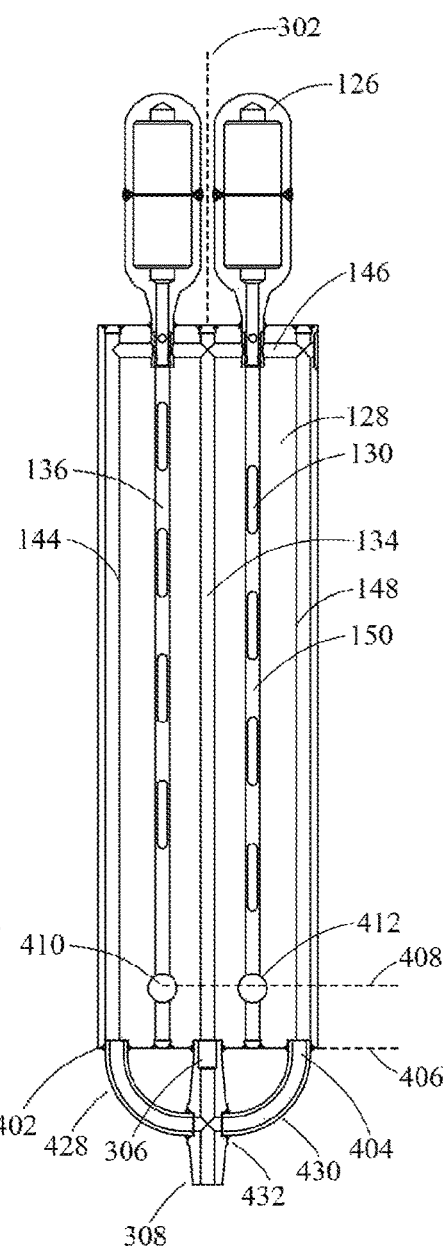
Figure 4D:
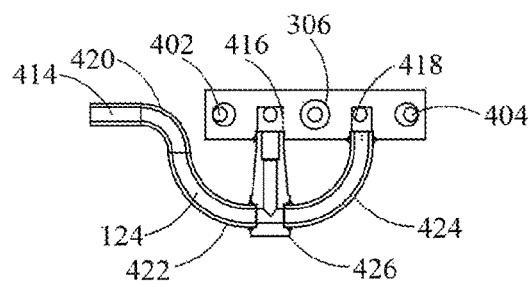

Referring to FIGS. 3 and 4, the interior of a longitudinal vertical gauge body (128) of a mica water level gauge glass is provided, for example but not limited to, five through cavities (150, 134, 136, 144, 148) in the longitudinal direction, as illustrated in the vertical direction in the figures. Using the center axis (302) of the longitudinal gauge body (128) as a reference, two steam-water cavities (136, 150) are provided on each side, namely to the left and right of the center axis (302) as illustrated in the figures. The remaining three cavities are thermal compensation cavities (134, 144, 148) provided on both sides of the steam-water cavities (136, 150) and in the center. A horizontal steam cavity (146) connecting the five through cavities is provided on the side near the top of the gauge body (128). Two condensation tanks (126) are respectively fastened, for example welded, to the two steam-water cavities (136, 150) on the top of the gauge body (128), and lower ends (410, 412) of the steam-water cavities (136, 150) are in fluid communication with the drum (102) through the water connecting pipe (124) and the water sampling pipe (106) outside the gauge body (128). The water connecting pipe (124) has a first end (414), a second end (416) and a third end (418), the first end of the water connecting pipe is connected to the outlet of the water tee fitting. The second end (416) and third end (418) are connected to the steam-water cavities (136, 150) respectively. Openings of the three thermal compensation cavities (134, 144, 148) at the top (152) of the gauge body (128) may be closed, for example, by welding. The three thermal compensation cavities (134, 144, 148) are connected, for example by welding, through the side openings of the horizontal steam cavity (146), to the steam connecting pipe (122), which in turn, is in fluid communication with the drum (102) through the steam sampling pipe (104). The lower end openings (306, 402, 404) of the thermal compensation cavities (134, 144, 148) are connected, for example through welding, to the auxiliary heat confluence device (138), at a first height (406). The auxiliary heat confluence device (138) is further connected through a lower end (308) to the downcomer (143) of the drum (102) through the compensation connecting pipe (140). The mica assembly (130) is mounted between the gauge body (128) and the capping (132). The water connecting pipe (124) may be welded and includes three bends (420, 422, 424) and a tee joint (426), and may he connected to the steam-water cavities (136, 150) inside the gauge body (128) through a hole drilled on the side of the gauge body (128) at a height (408). The auxiliary heat confluence device (138) may be welded and includes two bends (428, 430) and a four-way joint(432), and may be welded and connected to the ends of the thermal compensation cavities (134, 144, 148) on the bottom of the gauge body (128) to form a complete auxiliary heat circulation path.

In operation, the steam valve (108) and the water valve (110) are opened, saturated steam is guided through the steam sampling pipe (104), and the steam connecting pipe (122) outside the gauge body (128) to enter the gauge body (128) at the top (152). The saturated water is guided through the water sampling pipe (106), and the water connecting pipe (124) outside the gauge body (128) to enter the gauge body (128) at the bottom (154). The saturated steam and the saturated water are mixed in the steam-water cavities (136, 150), that is, a vertical water-steam path, a part of the saturated steam enters the condensation tank (126) and is cooled and introduced into the steam-water cavities (136, 150). The steam-water cavities (136, 150) are heated by the saturated steam through the thermal compensation cavities (134, 144, 148), that is, a vertical thermal compensation path, the saturated steam is cooled and flows into the compensation connecting pipe (140) to enter the downcomer (143) through the auxiliary heat confluence device (138).

SECOND EMBODIMENT

Referring to FIG. 5, compared to the first embodiment, the position of the auxiliary heat confluence device (138) relative to the gauge body (128) is different. The auxiliary heat confluence device (138) may be welded and includes two bends (502, 504) and an L-shaped four-way joint(508). The auxiliary heat confluence device (138) may be welded and connected to three holes (510, 512, 514) opened on the side of the gauge body (128), wherein the holes are in communication with the thermal compensation cavities (134, 144, 148), and forms a pathway with the thermal compensation cavities (134, 144, 148) in the gauge body (128). Here, the openings of the auxiliary heat confluence device (138) are located lower than the water connecting pipe (124) to ensure that the length of the thermal compensation cavities (134, 144, 148) is greater than the length of the steam-water cavities (136, 150).

In the embodiments shown in FIGS. 4 and 5, two steam-water cavities (136, 150) and three thermal compensation cavities (134, 144, 148) are shown. However, it will be apparent to persons skilled in the art that the mica water level gauge glass described in the present disclosure will function with a single thermal compensation cavity and a single steam-water cavity, with proper modification to the water connecting pipe and auxiliary heat confluence device structures.

Compared to the existing technology, the benefits of the present disclosure may include:

The structure of the water level gauge according to the present disclosure changes the approach as to how the three thermal compensation cavities (134, 144, 148) and the two steam-water cavities (136, 150) converge outside the gauge body (128), exemplarily, by drilling holes on the gauge body (128) to be respectively welded and connected with the auxiliary heat confluence device (138) and the water connecting pipe (124). There is no intersecting structure between the thermal compensation cavities (134, 144, 148) and the steam-water cavities (136, 150) inside the gauge body, which simplifies the manufacturing process of the mica water level gauge glass, avoids block welding inside the gauge body (128) and the risk of leaking points in the gauge body (128).

The structure of the water level gauge according to the present disclosure changes the approach so that the three thermal compensation cavities (134, 144, 148) exit below the convergence exit points of the steam-water cavities (136, 150) outside the gauge body (128), which saves significant space between the mica assembly window and the water exit point of the gauge body (128). A measurement window may be added on the water side of the gauge body, and the range of the water level measurement is increased without changing the original gauge body.

Compared to the existing technology, the present disclosure changes the connection structure and the connection position of the three thermal compensation cavities (134, 144, 148) and the two steam-water cavities (136, 150) in the gauge body (128), so that the thermal compensation cavities (134, 144, 148) are longer than the steam-water cavities (136, 150), which ensures that the measured water level is closer to the real water level in the drum, and improves the measurement accuracy.

The present disclosure has been described with regard to one or more embodiments. However, it will be apparent to persons skilled in the art that a number of variations and modifications can be made without departing from the scope of the disclosure as defined in the claims. For example, the First Embodiment and the Second Embodiment each has three thermal compensation cavities and two steam-water cavities. However, it will be apparent to persons skilled in the art that the mica water level gauge glass described in the present disclosure will function with a single thermal compensation cavity and a single steam-water cavity, with proper modification to the water connecting pipe and auxiliary heat confluence device structures.

What is claimed is:

1. A mica water level gauge glass for connecting to a boiler drum through a steam sampling pipe and a water sampling pipe, the mica water level gauge glass comprising:
    a steam tee fitting having an inlet, an outlet and a branch, the inlet of the steam tee fitting in communication with the steam sampling pipe;
    a water tee fitting having an inlet, an outlet and a branch the inlet of the water tee fitting in communication with the water sampling pipe;
    a balance pipe connecting the branch of the steam tee fitting and the branch of the water tee fitting;
    a steam connecting pipe having a first end and a second end, the first end of the steam connecting pipe connected to the outlet of the steam tee fitting;
    a water connecting pipe having a first end and a second end, the first end of the wate connecting pipe connected to the outlet of the water tee fitting;
    a longitudinal vertical gauge body comprising:
    a top;
    a bottom;
    a central vertical axis;
    a thermal compensation cavity having a first end near the top and a second end exiting the gauge body at a first height near the bottom;
    a steam-water cavity having a first end near the top and a second end exiting the gauge body at a second height near the bottom and connected to the second end of the water connecting pipe, the second height being higher than the first height, the second end of the steam-water cavity and the second end of the thermal compensation cavity being not lower than the bottom of the gauge body; and
    a horizontal steam side cavity in communication with the second end of the steam connecting pipe, the first end of the thermal compensation cavity and the first end of the steam-water cavity;
    a mica assembly along the steam-water cavity;
    an auxiliary heat confluence device having a first end and a second end, the first end connected to the second end of the thermal compensation cavity, the second end for draining condensed water; and
    a condensation tank at the top of the gauge body and aligned with the steam-water cavity in a vertical direction.

2. The mica water level gauge glass according to claim 1, wherein the thermal compensation cavity is a first thermal compensation cavity provided along the central vertical axis of the gauge body, the steam-water cavity is a first steam-water cavity on a left side of the first thermal compensation cavity, the water connecting pipe has a third end, the auxiliary heat confluence device has a third end and a forth end, the mica water level gauge glass further comprising:
- a second steam-water cavity on a right side of the first thermal compensation cavity, the second steam-water cavity having a first end connected to the horizontal steam side cavity, and a second end exiting the gauge body at the second height and connected to the third end of the water connecting pipe;
- a second thermal compensation cavity on a left side of the first steam-water cavity, the second thermal compensation cavity having a first end connected to the horizontal steam side cavity, and a second end exiting the gauge body at the first height and connected to the third end of the auxiliary heat confluence device; and
- a third thermal compensation cavity on a right side of the second steam-water cavity, the third thermal compensation cavity having a first end connected to the horizontal steam side cavity and a second end exiting the gauge body at the first height and connected to the fourth end of the auxiliary heat confluence device.

3. The mica water level gauge glass according to claim 2, wherein the water connecting pipe comprises three bends and a tee joint.

4. The mica water level gauge glass according to claim 2, wherein the auxiliary heat confluence device comprises two bends and an L-shaped four-way joint.

5. The mica water level gauge glass according to claim 1, further comprising:
- a steam valve connecting the steam sampling pipe and a steam valve connecting pipe, the steam valve connecting pipe connected to the inlet of the steam tee fitting; and
- a water valve connecting the water sampling pipe and a water valve connecting pipe, the water valve connecting pipe connected to the inlet of the water tee fitting.

6. The mica water level gauge glass according to claim 1, further comprising:
- a compensation connecting pipe connected to the second end of the auxiliary heat confluence device and a downcomer.

7. The mica water level gauge glass according to claim 1, wherein the mica assembly is a first assembly, further comprising a plurality of mica assemblies.

* * * * *